United States Patent
Alvarez et al.

(10) Patent No.: US 8,417,903 B2
(45) Date of Patent: Apr. 9, 2013

(54) PRESELECT LIST USING HIDDEN PAGES

(75) Inventors: Abraham Alvarez, Austin, TX (US);
Andrew Dunshea, Austin, TX (US);
Douglas J. Griffith, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 12/339,443

(22) Filed: Dec. 19, 2008

(65) Prior Publication Data
US 2010/0161934 A1    Jun. 24, 2010

(51) Int. Cl.
*G06F 12/12* (2006.01)

(52) U.S. Cl.
USPC ............ 711/159; 711/133; 711/134; 711/136; 711/160; 711/206

(58) Field of Classification Search .................. None
See application file for complete search history.

(56) References Cited

U.S. PATENT DOCUMENTS

| | | | |
|---|---|---|---|
| 6,073,226 A | 6/2000 | Cutshall et al. | |
| 6,378,059 B1 | 4/2002 | Miyoshi | |
| 7,007,005 B2 | 2/2006 | Rautenback et al. | |
| 7,139,879 B2 | 11/2006 | Loafman | |
| 2002/0013887 A1* | 1/2002 | Ting | 711/160 |
| 2006/0129780 A1 | 6/2006 | Dunshea et al. | |
| 2007/0055843 A1 | 3/2007 | Lameter | |
| 2007/0094450 A1* | 4/2007 | VanderWiel | 711/133 |

OTHER PUBLICATIONS

Author: National Center for Supercomputing Applications at The University of Illinois; Title: Performance Overview of the Virtual Memory Manager (VMM); article; Date: Feb. 24, 2007; pp. 9; Publisher: National Center for Supercomputing Applications at the University of Illinois at Urbana-Champaign; Location: Champaign, Illinois, USA.

* cited by examiner

*Primary Examiner* — Christian P Chace
*Assistant Examiner* — Alan Otto
(74) *Attorney, Agent, or Firm* — David Mims; Robert C. Rolnik

(57) ABSTRACT

Disclosed is a computer implemented method, computer program product, and apparatus for maintaining a preselect list. The method comprises software components detecting a page fault of a memory page. In response to detecting a page fault, the software components determine whether the memory page is referenced in the preselect list and unhide the memory page. Upon determining whether the memory page is referenced in the preselect list, the software components remove an entry of the preselect list corresponding to the memory page to form at least one removed candidate page and skip paging-out of the at least one removed candidate page.

18 Claims, 4 Drawing Sheets

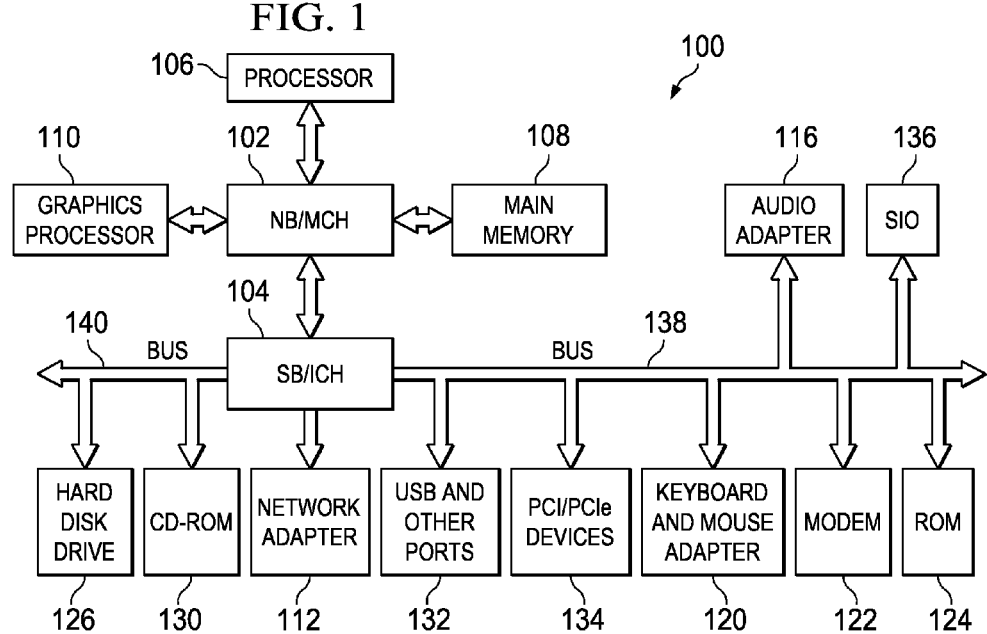
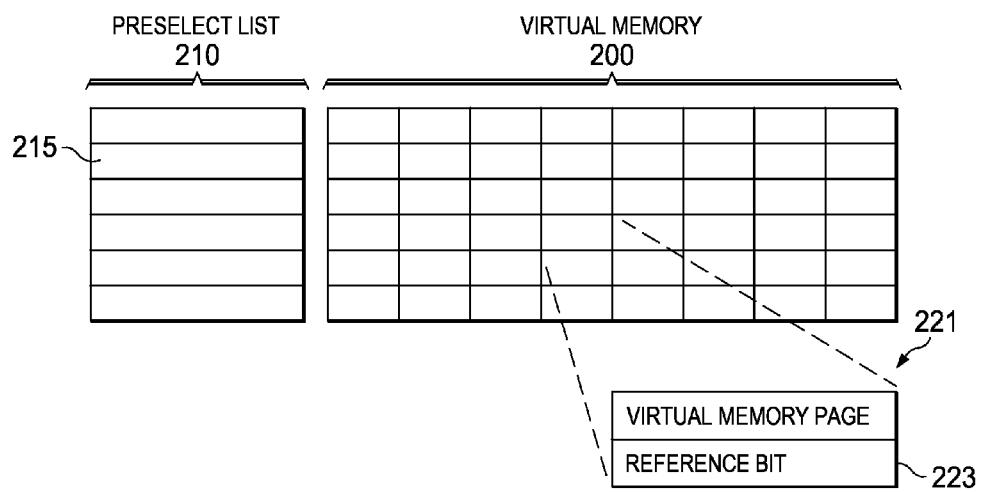

PRESELECT LIST USING HIDDEN PAGES

BACKGROUND OF THE INVENTION

1. Field of the Invention

The present invention relates generally to a computer implemented method, data processing system, and computer program product for caching disk data to memory. More specifically, the present invention relates to tracking potential candidate pages for paging-out and re-assessing their candidacy before a page-out occurs.

2. Description of the Related Art

In a computer system, Random Access Memory (RAM) contains the instructions or program to execute and the data necessary to execute those instructions. The resulting data from execution of the program code is also stored back into the RAM.

Modern computer systems use a Virtual Memory Manager (VMM) to provide on-demand paging to extend the size of memory. Such computer systems provide this feature because only the actual instructions and data required at a given point in time for execution need to reside in memory. The remaining portions of a program's instructions may be stored on disk until they are needed. The space where such instructions are stored is sometimes called paging space. Such a system can be complicated when there are multiple applications that run concurrently, or otherwise compete to use system resources.

System architects divide memory into units, often of equal sizes. These units are referred to as pages or frames. When a portion of a program's code or data is needed in RAM, it will be brought in one page at a time. Similarly, when a portion of a program or data is no longer needed in RAM it will be removed from the RAM to make room for other instructions or data. Thus, a memory page is a virtual block of storage, in either physical memory or persistent storage. Physical memory is volatile storage, such as, for example, RAM. Persistent storage is memory that requires no refreshing current to maintain data within the device.

The VMM manages the translation between the effective size of memory and the physical size of memory. The effective size of memory is also called the effective memory address range. The physical size of memory is also called the physical memory address range. The VMM maintains a map, which is used to translate the effective address of a page to the physical location of that page in RAM. This feature is known as a page translation. The entries in this map are called Page Translation Entries (PTE). When an effective memory address is accessed, which is not in physical memory, a page fault occurs. To satisfy the page fault and allow execution to continue, a memory page in physical memory will be selected for replacement if there are no free pages in physical memory. A page fault is an interrupt or an exception to the software raised by the undergirding hardware to indicate that a memory page mapped in address space is not resident in a particular place of physical memory. The reasons for the fault may vary. For example, the memory page may only be present in persistent storage and not found in physical memory. A page fault may also occur when a memory page is present in physical memory, but its status is not updated as present in hardware, at least with respect to the particular place of physical memory to which the memory page had primarily been assigned.

The VMM is responsible for steps such as selecting the memory page to replace, removing the contents of that page out of RAM, removing the PTE, loading the replacement memory page into physical memory, and adding a PTE. The data processing system continues program execution following these steps.

The VMM can use a variety of page replacement criteria when selecting memory pages in physical memory to be replaced with newly requested data. These criteria may be based on, for example, freshness of memory page access, and a number of times the memory page has been brought back into physical memory (re-paged). One example of a page replacement policy is based on a Least Recently Used (LRU) algorithm. Further examples may use LRU as a weighting factor in determining whether to remove a memory page as compared to other potential candidate pages. In some cases, many memory pages will need to be examined in RAM before suitable candidate pages for paging-out can be found. A candidate page is a memory page that is selected by a data processing system's page replacement software for paging-out to persistent storage when the next page-out cycle occurs. Paging-out is an operation where the contents of a physical memory corresponding to the memory page are copied to persistent storage, and optionally, a status bit is set to indicate that the physical memory is unused. Various user-tunable thresholds influence the operation of the page-replacement algorithm. Such thresholds include, for example, minfree, the minimum acceptable number of real memory page frames in the free list, and maxfree, the maximum size to which the free list will grow by VMM page stealing.

Finding a suitable candidate page in physical memory to replace can be a lengthy process. In addition, paging-out of a memory page from physical memory can be a lengthy process since the contents of the memory page being paged-out are saved to persistent storage if its contents have changed since being loaded into the physical memory. Accordingly, process improvements may occur if a list of candidate pages were limited to a more compact set of better candidates for paging out.

SUMMARY OF THE INVENTION

The present invention provides a computer implemented method, data processing system, and computer program product for paging-out memory pages in a virtual memory system. The method comprises software components detecting a page fault of a memory page. In response to detecting a page fault, the software components determine whether the memory page is referenced in the preselect list and unhide the memory page. Upon determining whether the memory page is referenced in the preselect list, the software components remove an entry of the preselect list corresponding to the memory page to form at least one removed candidate page and skip paging-out of the at least one removed candidate page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a data processing system in accordance with an illustrative embodiment of the invention;

FIG. 2A shows a pair of data structures used to track memory pages for paging-out in accordance with an illustrative embodiment of the invention;

DETAILED DESCRIPTION OF THE PREFERRED EMBODIMENT

Figure 2B:
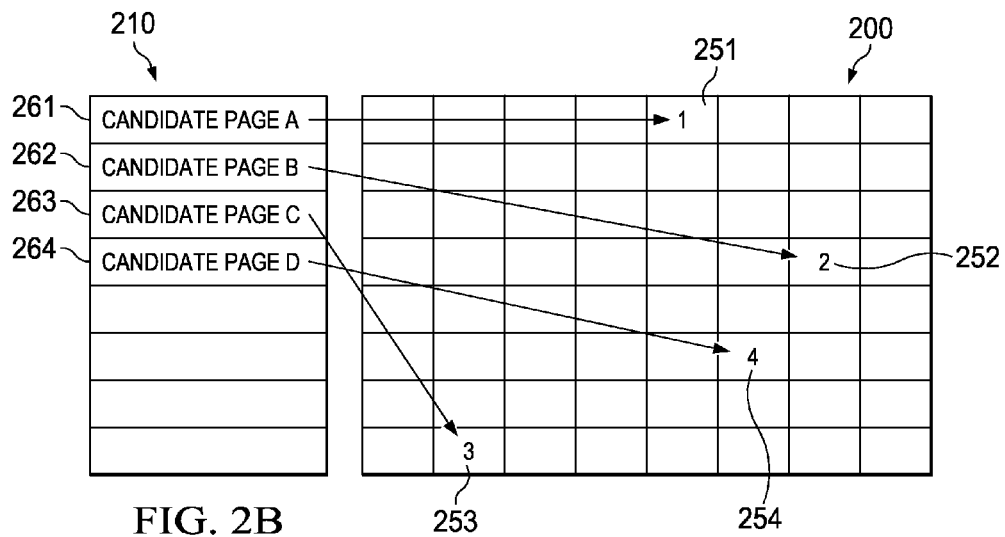
FIG. 2B is a preselect list and virtual memory occupied by memory pages in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for reducing a number of memory pages that are paged-out during a replacement page cycle. Removed candidate pages that had been formerly available in a preselect list are ignored for purposes of paging-out.

FIG. 2A shows a pair of data structures used to track memory pages for paging-out in accordance with an illustrative embodiment of the invention. The structures include a preselect list 210, and virtual memory 200. A preselect list is a list of page references that identify addresses in virtual memory. An entry of the preselect list may be a virtual memory page reference and may include a valid bit. A reference is an address that directly identifies a virtual memory address such that a processor may use the address to access the memory. The valid bit can indicate whether the entry continues reference a valid candidate page for re-paging. Accordingly, in some illustrative embodiments of the invention, the preselect list may contain a list of candidate pages that are marked for paging-out.

Each entry of preselect list 210 can be organized according to virtual page reference 215. The virtual memory 200 and preselect list 210 are empty in FIG. 2A.

Virtual memory 200 comprises virtual memory pages, for example, virtual memory page 221. Each memory page has reference bit 223 associated with it. A reference bit is a bit that is set by the Virtual Memory Manager (VMM) or other software component whenever the page is accessed. Reference bits may indicate a status for the virtual memory page concerning whether the virtual memory page has been referenced in a recent period, or whether the physical memory page has been modified in a recent period. When a software component hides a memory page, it omits associated translations for the memory page. Accordingly, hiding the memory page may force an address translation to occur when accessing the memory page. Memory pages referenced by the preselect list can be hidden in this manner.

FIG. 2B is a preselect list and virtual memory occupied by memory pages in accordance with an illustrative embodiment of the invention. As such, FIG. 2B represents a condition of memory after a time illustrated in FIG. 2A. Virtual memory pages may be in use, but hidden. Such physical memory pages include virtual memory page 1 251, virtual memory page 2 252, virtual memory page 3 253, and virtual memory page 4 254. Such pages are not tracked by the VMM, but instead are locatable by using a page fault handler and corresponding references in preselect list 210. Arrows provided in FIG. 2B signal the manner in which a virtual page reference actually refers to a virtual page.

Illustrative embodiments of the invention may establish the preselect list to include four candidate pages for paging-out, namely candidate page A 261, candidate page B 262, candidate page C 263, and candidate page D 264. Each candidate page references virtual memory page 1 251, virtual memory page 2 252, virtual memory page 3 253, and virtual memory page 4 254, respectively.

Figure 2C:
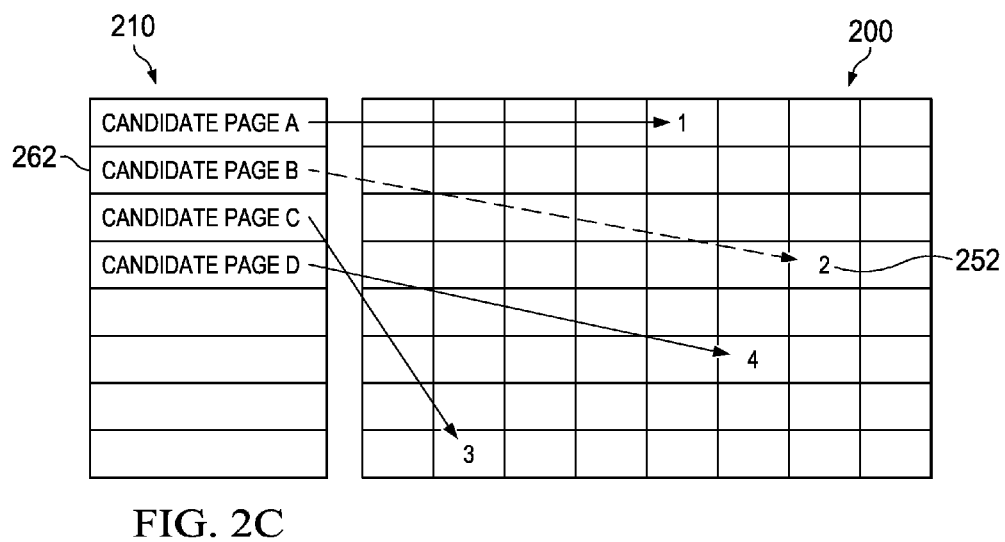
FIG. 2C shows a state of the preselect list and page frame table at a time after FIG. 2B in accordance with an illustrative embodiment of the invention.

FIG. 2C shows a state of the preselect list and page frame table at a time after FIG. 2B in accordance with an illustrative embodiment of the invention. At this time, the page fault handler has recently accessed virtual memory page 2 252. The absence of a valid candidate page B pointing to virtual memory is represented in a dashed arrow.

For embodiments that track valid preselect entries by setting or resetting valid bits, a software component can reset such a bit to binary '0'. Thus, the entry in the preselect list 210 entry corresponding virtual memory page 2 252, that is, the entry holding candidate page B 262, can have a corresponding valid bit reset to "not valid". Resetting may involve setting a bit to a binary '0', which, accordingly, may represent a state of "not valid". In effect, the resetting of the entry of candidate page B 262 removes the preselect list entry containing the reference to virtual memory page 2 252. Those skilled in the art will appreciate that additional ways to remove a preselect list may be used. Accordingly, the embodiments of the invention are not limited by the manner in which a preselect list entry is removed.

The process steps, described below, may be performed by two or more processes operating asynchronously but cooperatively. One process may be a process that runs continuously for as long as a system operates without rebooting. This process may be, for example, a daemon used to add virtual memory pages to a preselect list. In addition, the process steps below may be in part performed by one or more applications that signal or otherwise identify candidate pages not suitable for paging out. The steps of FIGS. 3A and 3B, below, may be prefaced by a page replacement daemon adding candidate pages to a preselect list.

Figure 3A:
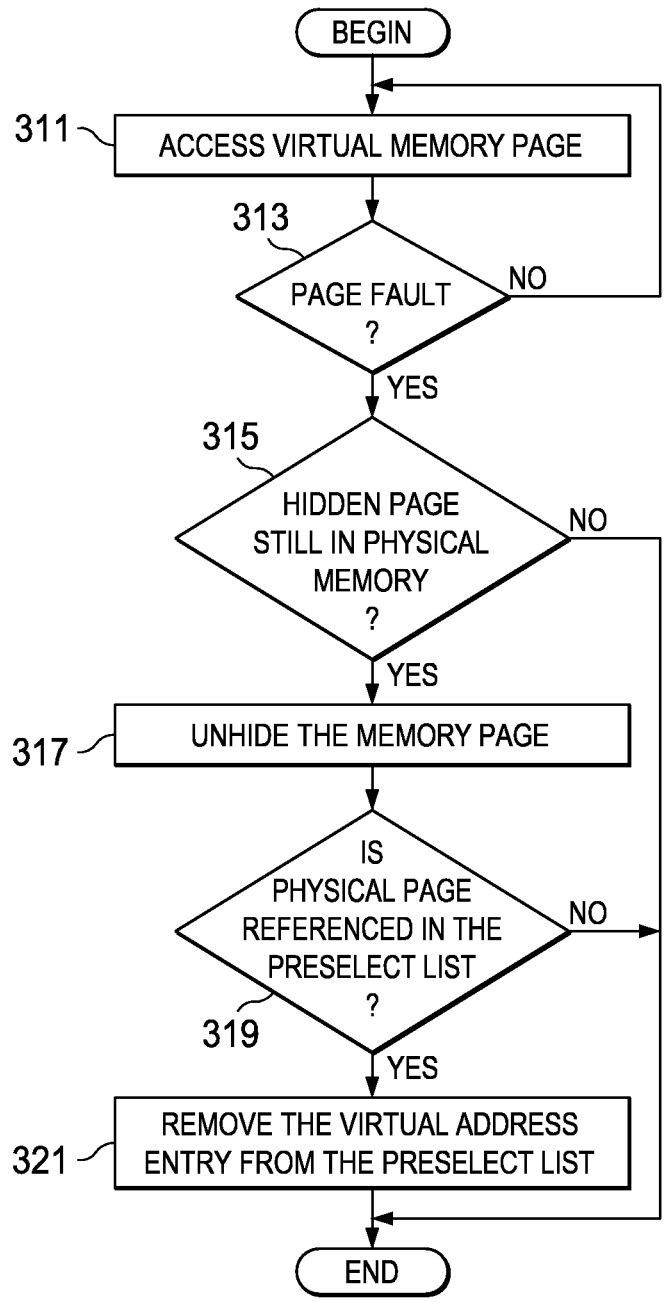
FIG. 3A is a flowchart performed by software components to maintain the preselect list in accordance with an illustrative embodiment of the invention.

FIG. 3A is a flowchart performed by software components to maintain the preselect list in accordance with an illustrative embodiment of the invention. The software components may include a daemon running in the operating system of, for example, data processing system 100 of FIG. 1. The daemon can be, for example, a page replacement daemon. Initially the data processing system accesses a virtual memory page (step 311). Next, the data processing system determines whether a page fault has occurred (step 313). If no page fault occurred, the data processing system may continue to access memory pages at step 311. However, if a page fault occurred, the data processing system may determine whether the memory page corresponding to the page fault has a counterpart physical page that continues to hold valid data of the memory page. The data processing system determines if a hidden page is still in physical memory (step 315) such that the hidden page is the backing store of the page-faulting memory page. This step may be performed by a process that runs on the data processing system. Nevertheless, this step is distinct from the process that determines a page fault in step 313.

A negative determination at step 315 causes processing to terminate. However, a positive determination may cause the data processing system to unhide the memory page (step 317). Next, the data processing system determines whether the physical page is referenced in the preselect list (step 319). The preselect list can be, for example, and indexed array, a linked list, or the like. If the memory page is not referenced by the preselect list, then the data processing system stops processing the steps of the flowchart. Generally, the data processing system performs a remove operation on the entry of the preselect list that references the physical page as determined in step 319. For example, a positive result at step 319 can cause the data processing system to remove the virtual address entry from the preselect list (step 321). Step 321 may be performed in a number of different ways. For example, the data processing system may be using a linked list as a preselect list. Accordingly, an entry stored by a node in the linked list may be removed by adjusting pointer references of neighboring nodes to the list to skip the removed node. Alternatives to this housekeeping function can include adjusting entries in an array to remove the selected entry. Removed entries are skipped over or otherwise not considered when determining candidate pages for paging out, as explained further in the flowchart of FIG. 3B, below. It is appreciated that steps 317 through 321 can be performed by an application that uses the memory page. In effect, the application shortens the list of pages to be paged-out. As a result, I/O efficiency can be improved by causing fewer pages to page out than otherwise would occur. In addition, since pages removed from the preselect list are themselves highly likely to be used again by an associated process or application, the I/O subsystem is also protected from having to page-in pages removed from the list by step 321. Importantly, though the flowchart above shows continuity from one step to the next, each step can be separated periods of varying lengths based on availability of system resources and number of processes competing for such resources. Various schemes to provide for parallelism or cooperation between processes can make each step occur asynchronously and in response to signals sent between and among several processes.

Figure 3B:
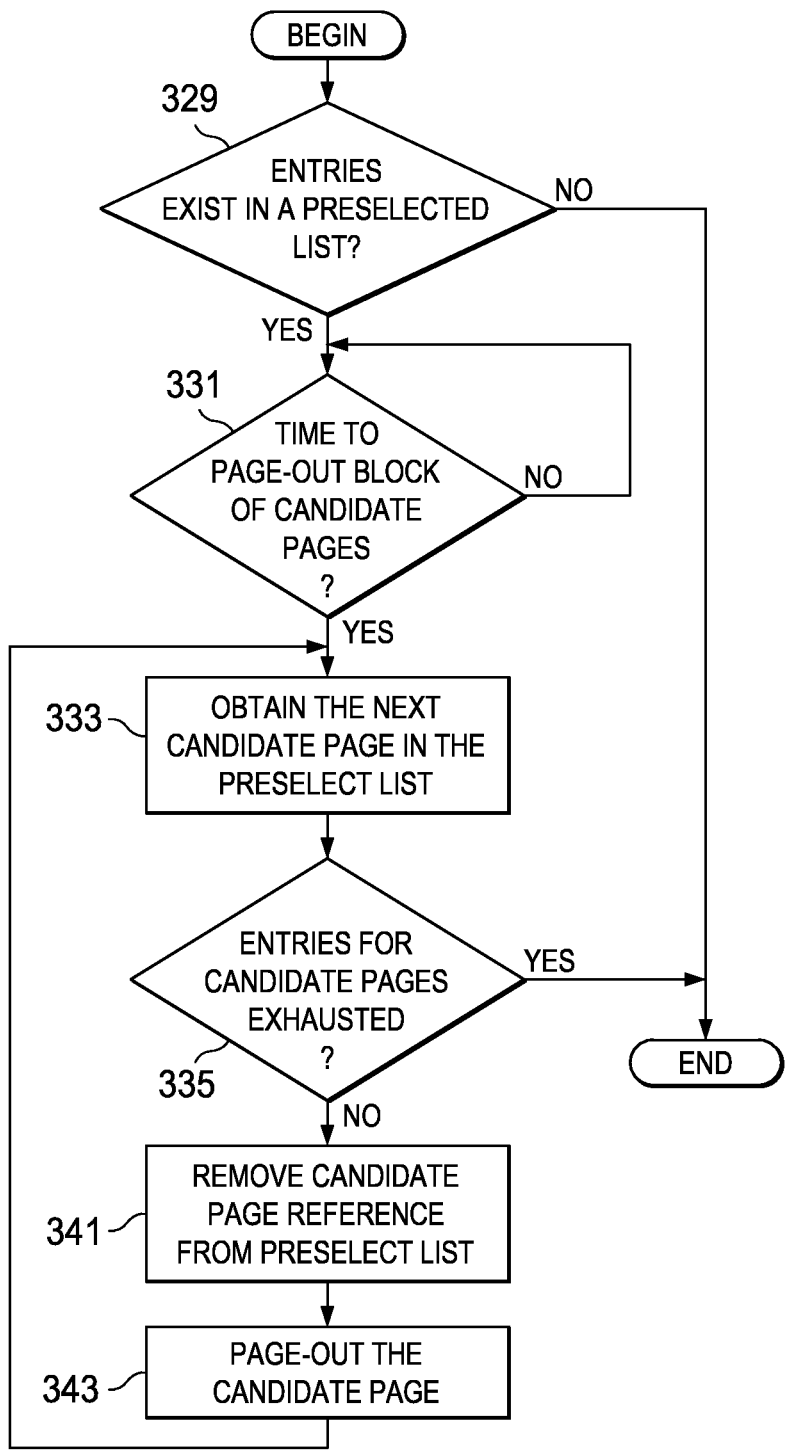
FIG. 3B is a flowchart of steps to page-out candidate pages found in the preselect list in accordance with an illustrative embodiment of the invention.

FIG. 3B is a flowchart of steps to page-out candidate pages found in the preselect list in accordance with an illustrative embodiment of the invention. The data processing system may begin by determining whether one or more entries exist in a preselect list (step 329). A negative outcome results in the process terminating thereafter. If the data processing system determines one or more entries exist, the data processing system determines if an event or other indication triggers the time to page-out a block of candidate pages (step 331). If not, the data processing system may repeatedly check for the time to page-out blocks in accordance with user-tuned thresholds. The determination made at step 331 can determine that it is time to page-out a block of candidate pages, that is, the data processing system reaches a positive determination. This determination may be because sufficient processing bandwidth exists on an I/O subsystem to perform paging. Next, the data processing system may obtain the next candidate page in the preselect list (step 333). The data processing system may determine that entries for candidate pages are exhausted (step 335). If so, processing terminates thereafter. If not, the data processing system may remove the candidate page reference from the preselect list (step 341). A removed candidate page is a candidate page removed in this manner. Next, the data processing system may page-out remaining candidate page references from the preselect list (step 343). Accordingly, the data processing system may skip paging-out removed candidate pages. Processing terminates thereafter.

Steps 329 through 341 may be performed by a software component that cooperates with a virtual memory manager. The actual page-out step, step 343, can be performed by the virtual memory manager.

In addition, a software component may prepare the preselect list by determining if the memory page is a candidate page for paging-out. Such a process can be described as preselection. Responsive to that determination, the software component may hide or otherwise mark as hidden the memory page. The software component can add a virtual page reference entry to the preselect list as a reference to the memory page.

It is appreciated that the preselect list may be formed from a linked list that includes a page reference at each node of the linked list. Nodes that are to be removed can be unlinked from such a linked list embodiment. Similarly, the addition of a new node or entry to the preselect list may involve adding an additional node to one end of the underlying linked list data structure. It is appreciated that the embodiments are not limited merely to arrays and linked lists, and that other suitable data structures known in the art may be used as alternatives to these implementations of a preselect list.

The illustrative embodiments of the invention permit a software component to efficiently begin paging-out pages by relying on a preselect list. A preselect list may be prepared ahead of a page-out so that rescanning may be minimized. Scanning and rescanning is the process of looking for candidate pages in order to replace such pages in physical memory. The illustrative embodiments of the invention create a preselect list of such candidate pages so that further evaluation is limited only to such candidate pages prior to paging-out one or more such candidate pages. Accordingly, since candidate pages can be already referenced via the preselect list, scanning is no longer required. The embodiments of the invention may reduce the occurrence of paging-out pages that are still needed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for maintaining a preselect list, the method comprising: a computer detecting a page fault of a memory page;
the computer, responsive to detecting the page fault, determining whether the memory page is referenced in the preselect list, wherein the preselect list comprises a list of page references which identify addresses in virtual memory; the computer, responsive to a determination that the memory page is referenced in the preselect list, unhiding the memory page; the computer, responsive to the determination that the memory page is referenced in the preselect list, removing an entry of the preselect list corresponding to the memory page to form at least one removed candidate page; the computer skipping paging-out of the at least one removed candidate page; the computer determining if the memory page is a candidate page for paging-out; responsive to a determination that the memory page is a candidate page for paging-out, the computer hiding the memory page, wherein hiding comprises setting a valid bit to an invalid indication in the preselect list; and the computer adding the entry to the preselect list, the entry having a reference to the memory page.

2. The method of claim 1, further comprising: obtaining the entry on the preselect list; determining if a valid bit is reset, wherein the valid bit is reset contemporaneously with removing the entry; and responsive to a determination that the valid bit is reset, skipping paging-out the physical page referenced by the entry.

3. A method for maintaining a preselect list, the method comprising: a computer detecting a page fault of a memory page;
the computer, responsive to detecting the page fault, determining whether the memory page is referenced in the preselect list, wherein the preselect list is an array of at least one entry, each entry having a virtual memory page reference and a valid bit; the computer, responsive to a determination that the memory page is referenced in the preselect list, unhiding the memory page; the computer, responsive to the determination that the memory page is referenced in the preselect list, removing an entry of the preselect list corresponding to the memory page to form at least one removed candidate page; the computer skipping paging-out of the at least one removed candidate page;

the computer determining if the memory page is a candidate page for paging-out;

responsive to a determination that the memory page is a candidate page for paging-out, the computer hiding the memory page, wherein hiding comprises setting a valid bit to an invalid indication in the preselect list; and the computer adding the entry to the preselect list, the entry having a reference to the memory page.

4. The method of claim 1, further comprising: obtaining a second entry of the preselect list; and responsive to obtaining the second entry, paging-out the page referenced by the second entry.

5. The method of claim 4, wherein the preselect list is a linked list of entries, each entry having a memory page reference.

6. The method of claim 5, wherein removing the entry from the preselect list comprises unlinking the entry from the preselect list.

7. A computer program product for maintaining a preselect list, the computer program product comprising: a non-transitory computer readable storage device having computer usable program code embodied therewith, the computer program product comprising: computer usable program code configured to detect a page fault of a memory page; computer usable program code configured to determine whether the memory page is referenced in the preselect list, wherein the preselect list comprises a list of page references which identify addresses in virtual memory; computer usable program code configured to unhide the memory page, responsive to a determination that the memory page is referenced in the preselect list; computer usable program code configured to remove an entry of the preselect list corresponding to the memory page, responsive to a determination that the memory page is referenced in the preselect list, removing the entry to form at least one removed candidate page; computer usable program code configured to skip paging-out of the at least one removed candidate page; computer usable program code configured to determine if the memory page is a candidate page for paging-out; computer usable program code configured to hide the memory page, responsive to a determination that the memory page is a candidate page for paging-out, wherein hiding comprises setting a valid bit to an invalid indication in the preselect list; and computer usable program code configured to add the entry to the preselect list, the entry having a reference to the memory page.

8. The computer program product of claim 7, further comprising:

computer usable program code configured to obtain the entry on the preselect list;

computer usable program code configured to determine if the valid bit is reset, wherein the valid bit is reset contemporaneously with removing the entry; and computer usable program code configured to skip paging-out the physical page referenced by the entry responsive to a determination that the valid bit is reset.

9. A computer program product for maintaining a preselect list, the computer program product comprising: a non-transitory computer readable storage device having computer usable program code embodied therewith, the computer program product comprising: computer usable program code configured to detect a page fault of a memory page; computer usable program code configured to determine whether the memory page is referenced in the preselect list, wherein the preselect list is an array of at least one entry, each entry having a virtual memory page reference and a valid bit; computer usable program code configured to unhide the memory page, responsive to a determination that the memory page is referenced in the preselect list; computer usable program code configured to remove an entry of the preselect list corresponding to the memory page, responsive to a determination that the memory page is referenced in the preselect list, removing the entry to form at least one removed candidate page; computer usable program code configured to skip paging-out of the at least one removed candidate page; computer usable program code configured to determine if the memory page is a candidate page for paging-out; computer usable program code configured to hide the memory page, responsive to a determination that the memory page is a candidate page for paging-out, wherein hiding comprises setting a valid bit to an invalid indication in the preselect list; and computer usable program code configured to add the entry to the preselect list, the entry having a reference to the memory page.

10. The computer program product of claim 7, further comprising: computer usable program code configured to obtain a second entry on the preselect list; and computer usable program code configured to page-out the physical page referenced by the entry responsive to obtaining the second entry.

11. The computer program product of claim 10, wherein the preselect list is a linked list of entries, each entry having a memory page reference.

12. The computer program product of claim 11, wherein removing the entry from the preselect list comprises unlinking the entry from the preselect list.

13. A data processing system comprising: a bus; a storage device connected to the bus, wherein computer usable code is located in the storage device; a communication unit connected to the bus; a processing unit connected to the bus, wherein the processing unit executes the computer usable code for maintaining a preselect list, wherein the preselect list comprises a list of page references which identify addresses in virtual memory and wherein the processing unit executes the computer usable program code to detect a page fault of a memory page; determine whether the memory page is referenced in the preselect list responsive to detecting the page fault; unhide the memory page responsive to a determination that the memory page is referenced in the preselect list; remove an entry of the preselect list corresponding to the memory page to form at least one removed candidate page, responsive to the determination that the memory page is referenced in the preselect list; skip paging-out of the at least one removed candidate page; determine if the memory page is a candidate page for paging-out; hide the memory page, responsive to a determination that the memory page is a candidate page for paging-out, wherein hiding comprises setting a valid bit to an invalid indication in the preselect list; and add the entry to the preselect list, the entry having a reference to the memory page.

14. The data processing system of claim 13, wherein the processing unit processor further executes computer usable code to obtain the entry on the preselect list; determine if a valid bit is reset, wherein the valid bit is reset contemporaneously with removing the entry; and skip paging-out the physical page referenced by the entry responsive to a determination that the valid bit is reset.

15. A data processing system comprising: a bus; a storage device connected to the bus, wherein computer usable code is located in the storage device; a communication unit connected to the bus; a processing unit connected to the bus, wherein the processing unit executes the computer usable code for maintaining a preselect list, wherein the preselect list is an array of at least one entry, each entry having a virtual memory page reference and a valid bit and wherein the processing unit executes the computer usable program code to detect a page fault of a memory page; determine whether the memory page is referenced in the preselect list responsive to detecting the page fault; unhide the memory page responsive to a determination that the memory page is referenced in the preselect list; remove an entry of the preselect list corresponding to the memory page to form at least one removed candidate page, responsive to the determination that the memory page is referenced in the preselect list; skip paging-out of the at least one removed candidate page; determine if the memory page is a candidate page for paging-out; hide the memory page, responsive to a determination that the memory page is a candidate page for paging-out, wherein hiding comprises setting a valid bit to an invalid indication in the preselect list; and add the entry to the preselect list, the entry having a reference to the memory page.

16. The data processing system of claim 13, wherein the processing unit processor further executes computer usable code to obtain a second entry on the preselect list; and page-out the physical page referenced by the second entry responsive to obtaining the second entry.

17. The data processing system of claim 16, wherein the preselect list is a linked list of entries, each entry having a memory page reference.

18. The data processing system of claim 17, wherein removing the entry from the preselect list comprises unlinking the entry from the preselect list.

* * * * *